United States Patent [19]
Erman

[11] Patent Number: 5,442,864
[45] Date of Patent: Aug. 22, 1995

[54] LEVEL

[76] Inventor: Michael A. Erman, 276 Old Elm, Bolingbrook, Ill. 60440

[21] Appl. No.: 38,897

[22] Filed: Mar. 29, 1993

[51] Int. Cl.$^6$ .............................................. G01C 9/26
[52] U.S. Cl. ...................................... 33/376; 33/370; 33/374
[58] Field of Search ................. 33/376, 365, 367, 370, 33/374

[56] References Cited

U.S. PATENT DOCUMENTS

| | | | |
|---|---|---|---|
| 1,074,367 | 9/1913 | Keefauver | 33/376 |
| 1,294,856 | 2/1919 | Willis | 33/376 |
| 3,296,708 | 1/1967 | Moody | 33/371 |
| 3,328,887 | 7/1967 | Wright | 33/374 |
| 3,475,101 | 10/1969 | Jeffery, Sr. | |
| 3,826,013 | 7/1974 | Baher | 33/390 |
| 4,446,627 | 5/1984 | Persson | 33/497 |
| 4,607,437 | 8/1986 | McSorley, Sr. et al. | 33/374 |
| 4,660,292 | 4/1987 | Richardson | 33/451 |
| 4,912,851 | 4/1990 | Rando et al. | 33/227 |
| 4,964,219 | 10/1990 | Clark | 33/451 |
| 5,263,260 | 11/1993 | Smith | 33/371 |

FOREIGN PATENT DOCUMENTS 348356  5/1931  United Kingdom ................. 33/386

Primary Examiner—William A. Cuchlinski, Jr.
Assistant Examiner—Christopher W. Fulton
Attorney, Agent, or Firm—Emrich & Dithmar

[57] ABSTRACT

A hand tool for leveling operations includes level and plumb indicators in an elongated, linear support member, or body. Disposed on opposed ends of the support member are first and second telescoping extension members. By positioning the distal end of one extension member in a recessed point or line on a wall, commonly known as a "quirk", and using the level indicator, a point or a line on another adjacent wall at the same elevation, or height, may be precisely located. The opposed extensions may also be used with a ruler to precisely measure the vertical distance between a structure inaccessible by a conventional level, such as a doorway header, and the edge of an adjacent structure, such as a ceiling beam. Another embodiment includes a plurality of spaced, retractable projections along the length of the support member which are particularly useful for leveling a structure such as where the level is too long for positioning within the structure, such as a doorway. Two or more of the projections may be positioned in contact with an inner surface of the structure for precisely leveling or plumbing the structure.

6 Claims, 5 Drawing Sheets

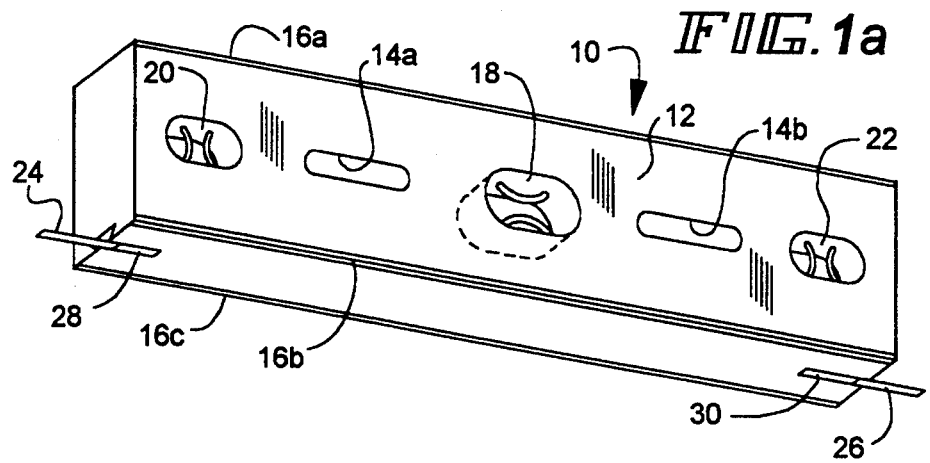
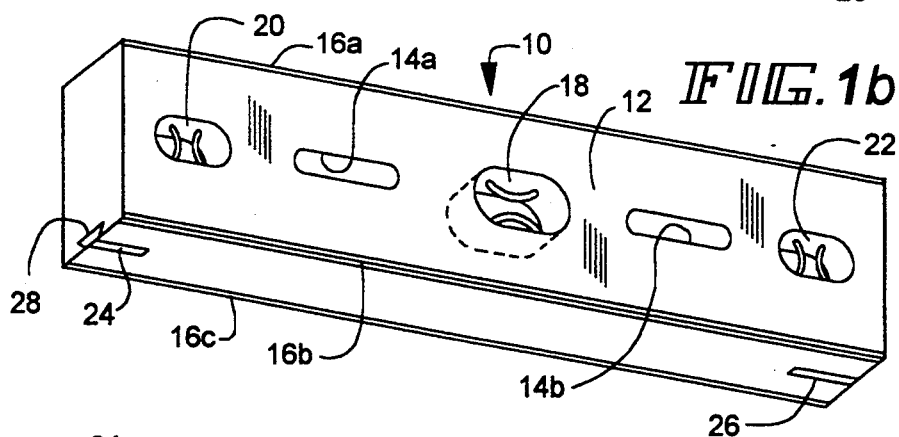
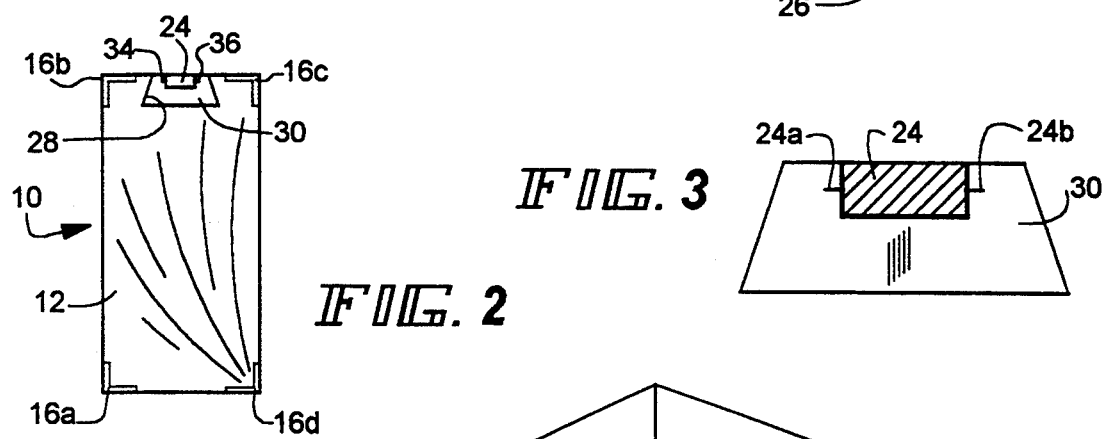
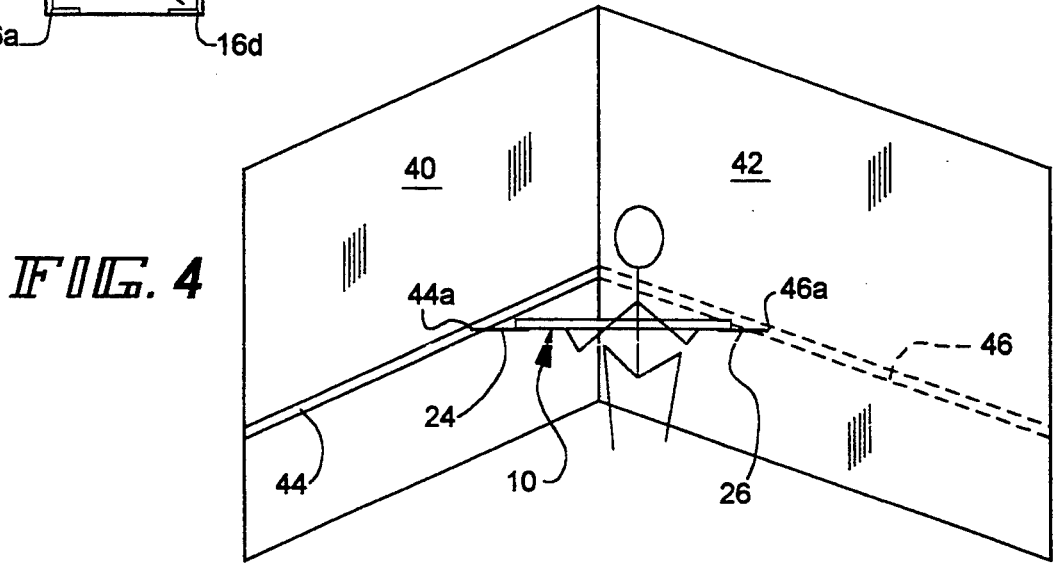

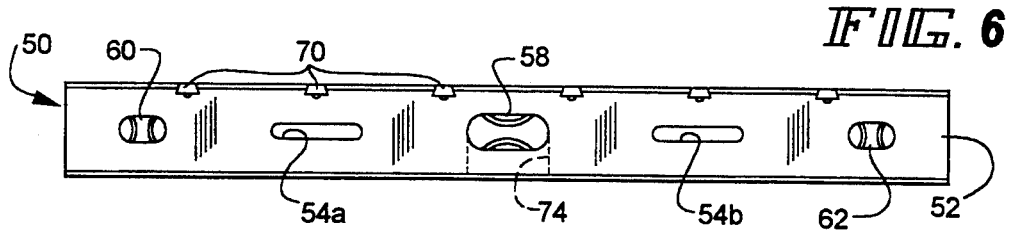
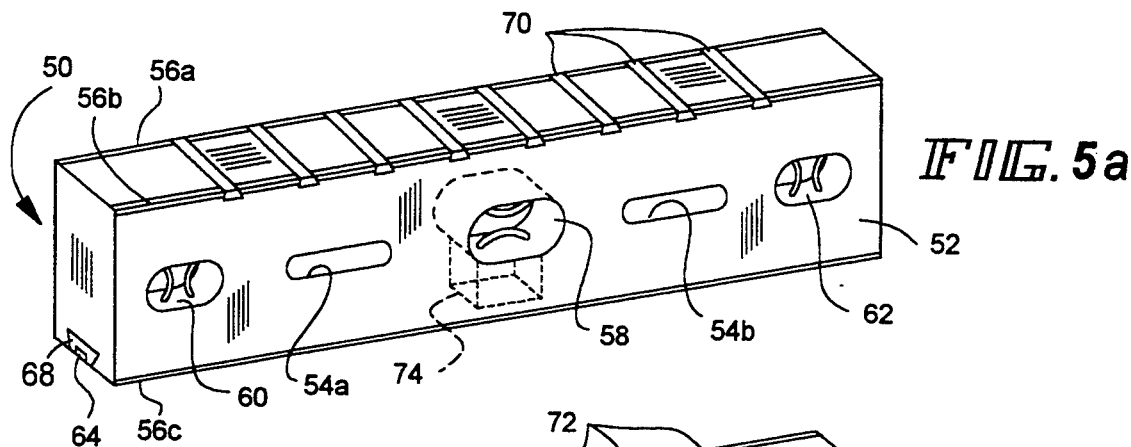
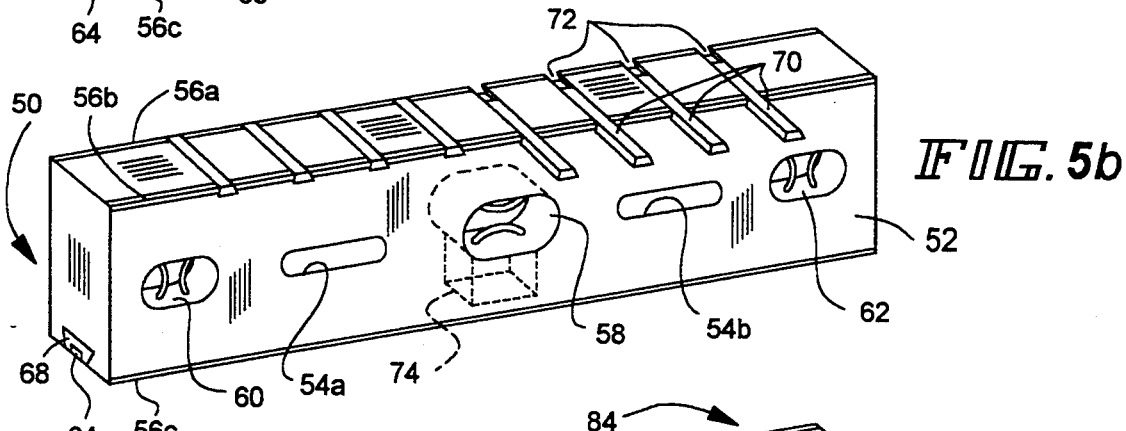
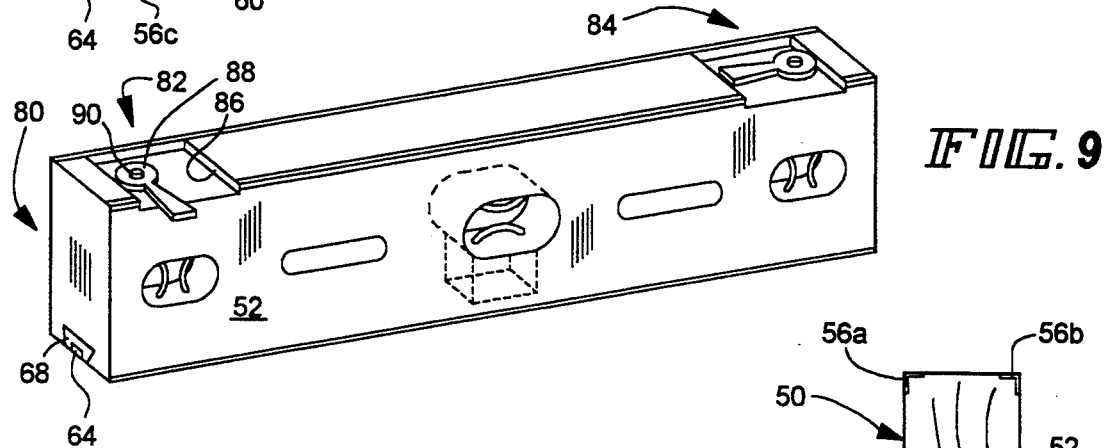
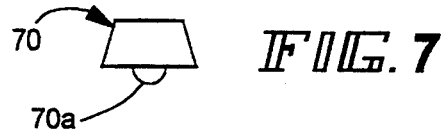
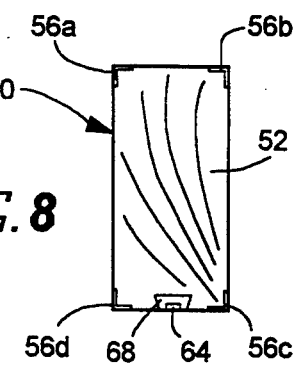

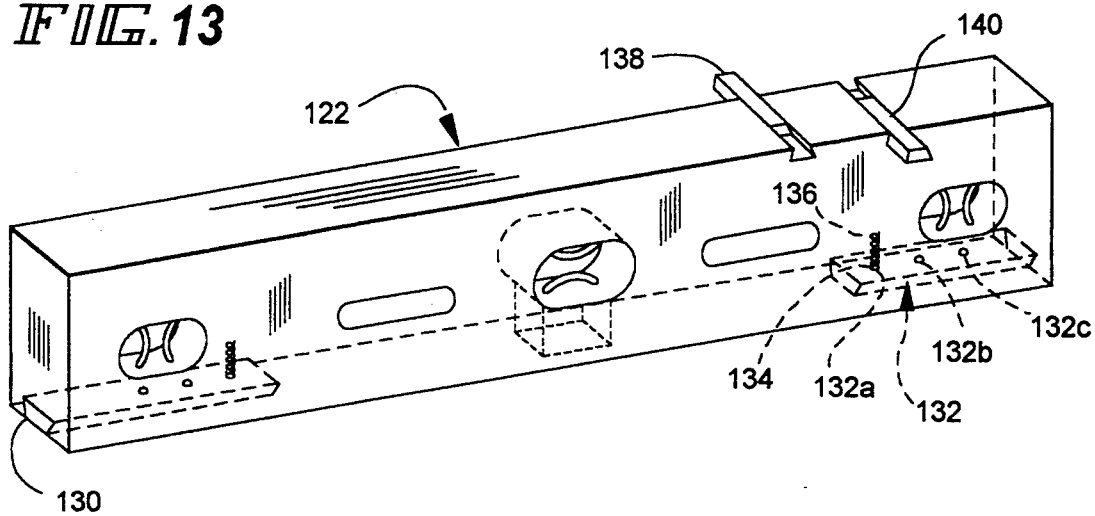
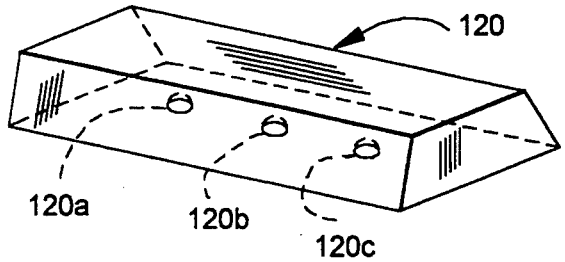
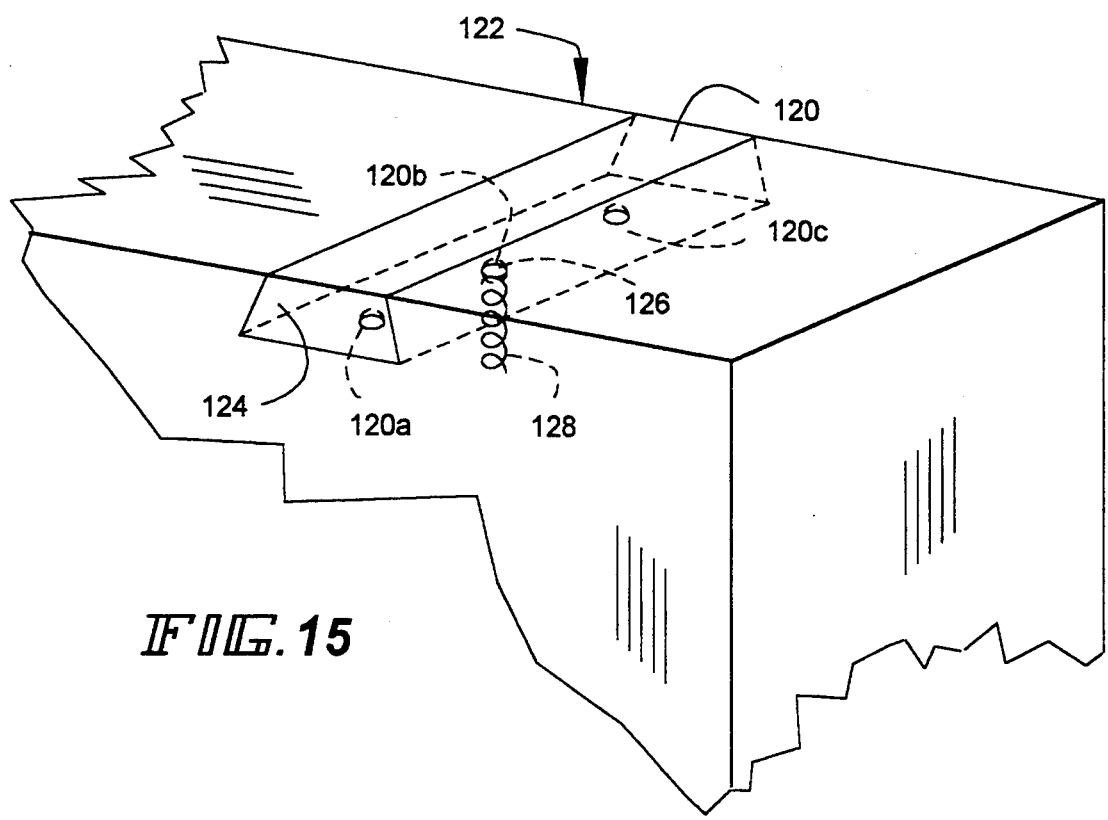

LEVEL

FIELD OF THE INVENTION

This invention relates generally to hand tools such as used in carpentry or building layout and is particularly directed to a hand tool for locating generally inaccessible points or horizontal lines on different surfaces at the same elevation, for determining the vertical distance between two structures where at least one of the structures has only limited access, or for leveling or plumbing a structure inaccessible by a conventional carpenter's level.

BACKGROUND OF THE INVENTION

A carpenter's level is the standard tool for determining whether a particular structural member is plumb, level or at some desired angle in between. The carpenter's level typically includes several spirit level vials disposed within the level's body, or frame, and mounted with their axes respectively parallel to, perpendicular to and at a 45° angle with respect to the longitudinal axis of the level. The level itself is typically on the order of three or four feet long and may include a wooden or metal body.

The carpenter's level is convenient to use when a surface of the structural member, or members, is accessible to the level. The level is merely placed in contact with a surface of the structural member and a visual reading is taken of one or more of the spirit levels. Frequently, the length, height or thickness of the level's body render the portion of the structural member to be positioned or oriented inaccessible. For example, it is sometimes necessary to locate a point or line on one surface level with a recessed point or line on another, adjacent surface. Such recessed points or lines are generally referred to as "quirks." The dimensions of the level's body limit its access to the quirk and render it impossible to mark a corresponding spot or line on another surface at the same height, or elevation. Another situation where a standard level of 4' in length is of limited use is in the leveling of a narrow doorway. The length of the standard size level prevents it from being positioned in contact with the doorway's header or threshold and typically requires the use of another level of shorter length. The requirement for various sized levels for specific uses presents an inconvenience for the worker and an added expense. Numerous other situations arise where it is necessary to either locate or orient one structural member relative to another structural member where the latter is not accessible by a conventional level of standard height, thickness and length.

The present invention addresses the aforementioned problems encountered by prior art devices by providing an improved level of standard size which is adapted for use in limited space situations which heretofore required a smaller level. The improved level provides access to hard to get to locations and structural members for the purpose of either leveling, or plumbing, the structural member or for locating a level point or line on another, adjacent surface.

OBJECTS AND SUMMARY OF THE INVENTION

Accordingly, it is an object of the present invention to provide apparatus for locating a point (or line) on one surface at the same height, or elevation, as a recessed point, or line, on another adjacent surface.

It is another object of the present invention to level or plumb a structure which has no edge or surface accessible by a conventional sized level.

Yet another object of the present invention is to provide for measuring the vertical distance between adjacent structures, where at least one of the structures is inaccessible by a conventional level.

A further object of the present invention is to provide a carpenter's level having a standard sized body which is particularly adapted for use in situations heretofore requiring a smaller level for positioning or orienting a structural member.

One embodiment of the present invention contemplates a hand tool for leveling operations including level and plumb indicators disposed in an elongated, linear body, or support member, which includes first and second end telescoping extension members. By positioning the distal end of one of the extension members in contact with an inaccessible recessed point or line on a first surface, a second point, or line, at the same height, or elevation, on a second, adjacent surface can be precisely located using the level's second extension member. The opposed extensions on respective ends of the level may also be used, in combination with a ruler, to precisely measure the vertical distance between adjacent structures which are inaccessible by a conventional level. For example, the vertical distance between the upper edge of a window frame and a ceiling beam may be measured using the level of the present invention with a conventional ruler. Another embodiment of the invention contemplates a plurality of spaced, extendible projections disposed along the length of the level's body. The movable projections are preferably spaced every 6" and allow for level and plumb measurements for structures and in spaces not large enough to receive the level. For example, the spaced projections allow for leveling a door header or threshold where the length of the level precludes its positioning within the doorway. A viewing aperture within the level's body facilitates visual inspection of the level indicator when used overhead while the spaced projections are in contact with the structural member being leveled or plumbed.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 1a and 1b are perspective views of an improved level in accordance with one embodiment of the present invention respectively showing the end extensions extended and retracted;

FIG. 2 is an end-on view of the level of FIGS. 1a and 1b;

FIG. 3 is an end-on view of a dovetail insert incorporating an end extension in accordance with the embodiment of the invention shown in FIGS. 1a and 1b;

FIG. 4 is a simplified perspective view illustrating the manner in which the level of the present invention is used in marking a point or line in one surface at the same level, or elevation, as a recessed point or line in another, adjacent surface;

FIGS. 5a and 5b are perspective views of another embodiment of the present invention incorporating extendible projections along the length thereof, wherein the extendible projections are respectively shown retracted and extended in FIGS. 5a and 5b;

FIG. 6 is a side elevation view of the embodiment of the level including a plurality of spaced extendible projections along the length thereof;

FIG. 7 is an end-on view of an extendible projection for use in the embodiment of the invention shown in FIGS. 5a, 5b and 6;

FIG. 8 is an end-on view of the level shown in FIGS. 5a and 5b;

FIG. 9 is a perspective view of yet another embodiment of the inventive level including a pair of extendible projections arranged in a spaced manner along the length of the level;

FIG. 13 is a perspective view shown partially in phantom of another embodiment of a level in accordance with the principles of the present invention;

FIG. 14 is a perspective view of an extendible projection for use in the inventive level; and FIG. 15 is a partial perspective view of another embodiment of the inventive level illustrating details of an extendible projection installation in the level.

DETAILED DESCRIPTION OF THE PREFERRED EMBODIMENTS

Figure 10A:
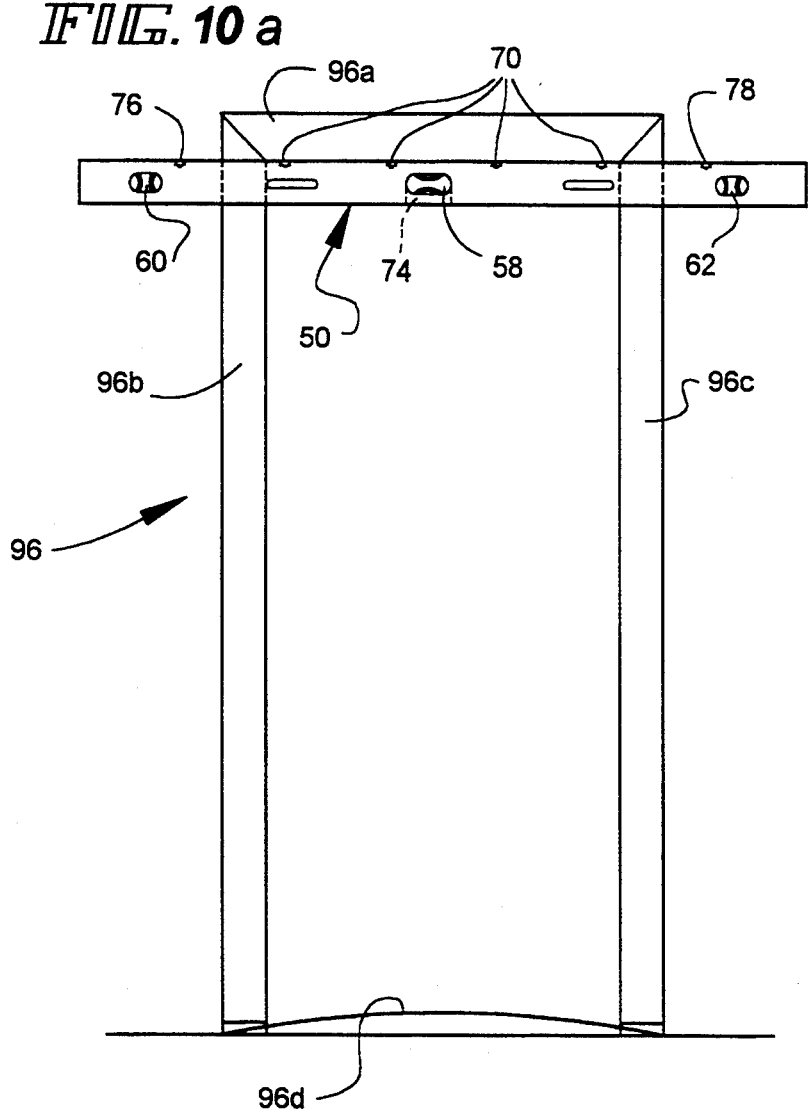
FIGS. 10a and 10b are respectively front and side elevation views of a doorway showing the manner in which the doorway header may be leveled using the level of the present invention.

Referring to FIG. 1a, there is shown a perspective view of an improved level 10 in accordance with the present invention. An end-on view of level 10 is shown in FIG. 2. Level 10 includes an elongated, linear body, or support frame, 12 typically comprised of wood, but which may also be comprised of metal or plastic. Disposed on the edges of the support frame 12 and extending the length thereof are a plurality of metal corner strips 16a, 16b, 16c and 16d. Support frame 12 includes a center level indicator 18 and first and second plumb indicators 20 and 22 disposed toward respective ends of the support frame. Level indicator 18 and the first and second plumb indicators 20, 22 are each disposed within a respective hollowed-out portion of the support frame 12. Level indicator 18 includes a pair of spirit level vials mounted with their axes parallel to the longitudinal axis of the level 10, while the first and second plumb indicators 20, 22 have their axes oriented generally perpendicular to the longitudinal axis of the level. A pair of spaced gripping slots 14a and 14b are also typically provided for in the support frame 12 to facilitate manual positioning of the level 10.

In accordance with this embodiment of the present invention, there is disposed on respective ends of level 10 first and second extensions 24 and 26. Details of the first extension installation are shown in the end view of FIG. 2. Disposed in respective, opposed ends of the level's support frame 12 are dovetail slots, where the first dovetail slot 28 is shown in the end view of FIG. 2. Disposed within the first dovetail slot 28 in a tight-fitting manner is a first dovetail insert 30. A second insert is disposed in a second dovetail slot disposed on the opposed end of the level 10. The outer surface of dovetail insert 30 includes an elongated slot extending the length thereof within which is positioned in a sliding manner the first end extension 24 as shown in the end-on view of the insert of FIG. 3. The first end extension 24 includes first and second lateral projections, or fingers, 24a and 24b disposed on opposed surfaces thereof which are adapted for insertion within respective elongated, linear slots 34, 36 in the first dovetail insert 30. The tight-fitting positioning of the first end extension 24 on the outer surface of the first dovetail insert 30 and the first and second lateral projections 24a, 24b permit the first end extension to freely slide within and along the length of the dovetail insert. FIG. 1a shows the first and second end extensions 24, 26 in the extended configuration, while FIG. 1b is a perspective view of the improved level 10 showing the first and second end extensions in the retracted position. Each of the dovetail inserts is inserted within a respective end slot in level 10 in a tight-fitting manner and is securely maintained therein. An adhesive such as conventional rubber cement may be used to affix an insert in a respective dovetail slot. Each of the dovetail inserts is preferably comprised of wood or plastic, while the end extensions are preferably comprised of metal such as steel.

Referring to FIG. 4, there is shown a simplified schematic diagram of the manner in which the level 10 may be used to locate a point (or line) in one surface at the same level, or elevation, as a point (or line) in another, adjacent surface. As shown in the figure, a first wall 40 has disposed therein a horizontal recessed line 44 which includes a recessed point 44a. Such recesses, whether in the form of a point or a line, are commonly referred to as "quirks." A user of the level 10 inserts an extended first end extension 24 into recessed point 44a in the first wall 40 and, using the level indicators in the level marks a second point 46a in a second, adjacent wall 42 at the same level, or elevation, as the first point in the first wall. A second horizontal line 46 extending through the second point 46a may then be marked on the second wall 42 using level 10 in a conventional manner. In this way, one may measure and mark relative to a first recessed point or recessed line in a first surface, a second point or line at the same level in a second, adjacent wall. A conventional level cannot be used to precisely locate a quirk and either a line or point in another adjacent surface at the same level as the quirk. The level 10 of the present invention allows a single worker to easily measure and mark a second point or horizontal line on a second surface at the same level as a first recessed point or line in a first, adjacent surface.

Referring to FIG. 5a, there is shown a perspective view partially in phantom of another embodiment of an improved level 50 in accordance with the present invention. A side elevation view of level 50 is shown in FIG. 6, while an end-on view of the level is Shown in FIG. 8. As in the previous embodiment, level 50 also includes a center level indicator 58 and first and second plumb indicators 60 and 62 disposed toward respective ends of the level's elongated, linear body 52. Disposed on respective corners of the level's body 52 and extending the length thereof are metal corner strips 56a, 56b, 56c and 56d. Also disposed in the level's body 52 as in the previous embodiment are a pair of spaced gripping slots 54a and 54b. Disposed adjacent the level indicator 58 and shown in dotted-line form in the figures is a level indicator aperture 74 which extends to an outer surface of the level's body 52.

Disposed in a spaced manner along the length of the surface of the level's body 52 are a plurality of extendible projections 70. Each of the extendible projections 70 is inserted in a respective dovetail slot 72 in the surface of the level's body 52. FIG. 5b shows the four extendible projections 70 on the right in the extended position, while the four extendible projections on the left are shown in the retracted position within a respective dovetail slot in the level's body 52. FIG. 7 is an end view of one of the extendible projections 70 which includes a dovetail-matching shape for tight-fitting positioning within and engagement with a respective slot 72 in the surface of the level's body 52. Disposed on an inner surface of the extendible projection 70 is a projection 70a disposed in a groove (not shown for simplicity) within a respective upper dovetail slot 72. Inner projection 70a extends from the extendible projection 70 and engages an outer, corner edge of the level's body 52 when the projection 70 is extended so as to prevent further extension and removal of the projection from the level's body. Inner projection 70a disposed on the inner surface of each of the extendible projections 70 thus serves as a retaining means for preventing complete withdrawal of the projections from the level's body 52. This embodiment is shown in the figures as including an end extension 64 and dovetail insert 68 combination (only one of which is shown in the figures for simplicity) as in the previous embodiment. However, the embodiment of the invention shown in FIGS. 5a and 5b through FIG. 8 including the extendible projections 70 is separate and independent from the level end extensions described above.

Referring to FIG. 9, there is shown another embodiment of the improved level 80 including a different form of first and second extendible projections 82 and 84. With reference to the first extendible projection 82, it being understood that the second extendible projection 84 has a similar configuration and operation, the extendible projection is disposed in a recessed portion, or slot, 86 in the surface of the level's body 52. Extendible projection 82 includes a pivoting projection member 88 attached to the level's body 52 by means of a mounting pin such as a threaded screw 90. Projection member 88 is freely rotatable between an extended position as shown for the case of the first extendible projection 82 and a retracted position as shown in the case of the second extendible projection 84. When extended, the extendible projection member 88 extends beyond a lateral edge of the level's body 52. The embodiment of the invention shown in FIGS. 5a and 5b through FIG. 9 for leveling or plumbing a structural member inaccessible by a conventional level will now be described.

Figure 10B:
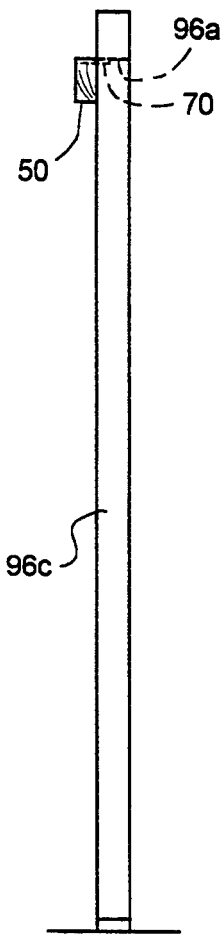

Referring to FIGS. 10a and 10b, there are respectively shown front and side elevation views of level 50 used for leveling a structural element inaccessible by a conventional level. Level 50 is shown in FIGS. 10a and 10b as used for leveling a header 96a of a doorway 96. Doorway 96 also includes left and right upright supports 96b and 96c and a lower threshold 96d. As shown in the figures, extendible projections 70 are positioned so as to engage a lower edge of the doorway's header 96a. Only those projections 70 disposed between the right and left upright supports 96b and 96c are extended from the level 50 and engage a lower edge of header 96a. Other extendible projections such as elements 76 and 78 shown in the figure are not extended from the level 50 because they are disposed outside of the left and right upright supports 96b and 96c. The extendible projections 70 thus provide access for level 50 to a structural element which would otherwise be inaccessible by the level because the length of the level is greater than the space provided for accessing the structural element. Once the level's level indicator 58 indicates the doorway's header 96a is level, spacers such as shims (which are not shown for simplicity) disposed under the doorway's left and right upright supports 96b, 96c may be used in a conventional manner to level the header. In a similar manner, the level's first and second plumb indicators 60 and 62 may be used to plumb a structure too short to provide access by a conventional level.

Figure 11A:
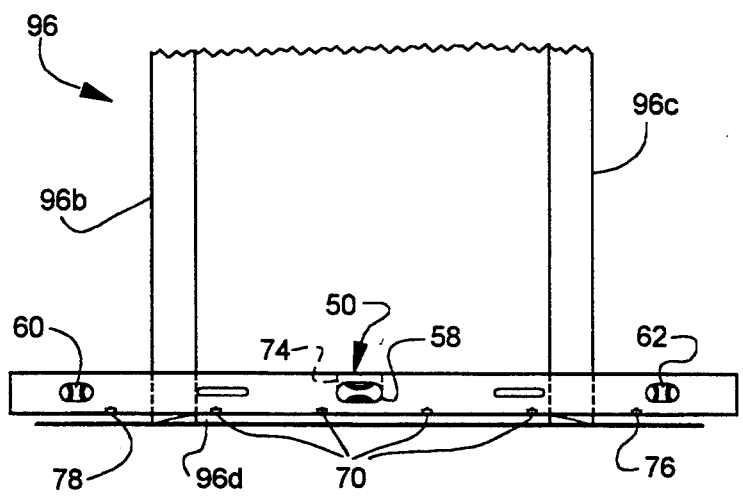
FIGS. 11a and 11b are respectively partial front and side elevation views of a doorway showing the manner in which the doorway threshold may be leveled using the level of the present invention.
Figure 11B:
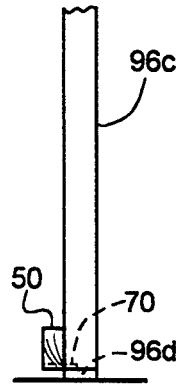

Referring to FIGS. 11a and 11b, there are respectively shown partial front and side elevation views of the doorway 96 and the manner in which level 50 is employed for leveling the doorway threshold 96d. As shown in the figures, the inner extendible projections 70 disposed intermediate the left and right upright supports 96b and 96c are extended from level 50 and positioned in contact with the doorway's threshold 96d. The outer extendible projections 76 and 78 are not used because they are disposed outside of the right and left upright supports 96b, 96c. As in the previously described use in leveling header 96a, the level indicator 58 is used in the arrangement of FIGS. 11a and 11b to level the doorway's threshold 96d. In leveling header 96a or threshold 96d, the level indicator aperture 74 (shown in dotted-lines in the figures) facilitates viewing the level indicator 58 particularly when the level 50 is used in an elevated, overhead position. Shims (not shown) may be used in a conventional manner to level the doorway's threshold 96d as described above.

Figure 12:
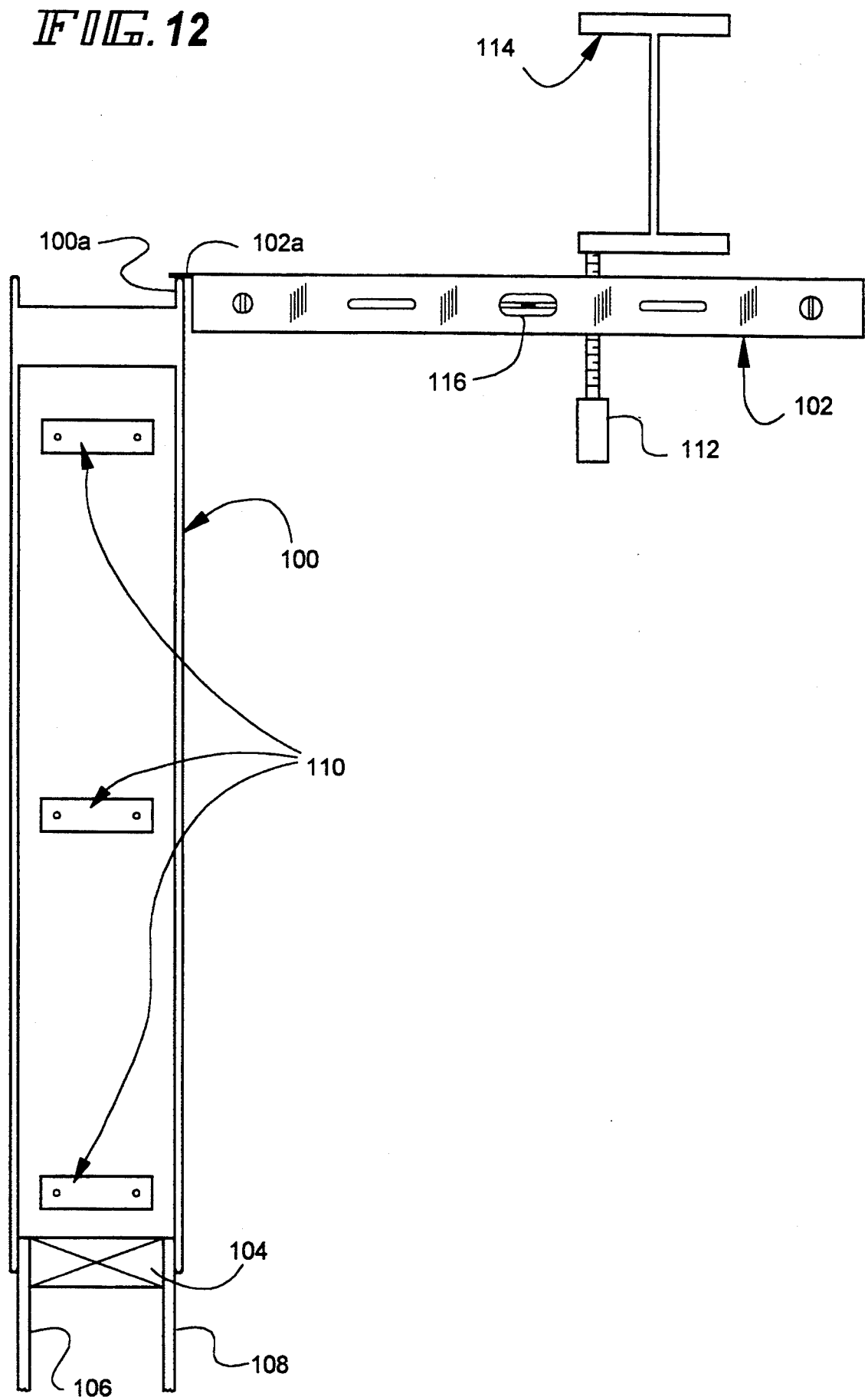
FIG. 12 is a simplified schematic diagram illustrating the manner in which the level of the present invention may be used to precisely measure the vertical distance between the top of a window frame and the bottom of a ceiling beam.

Referring to FIG. 12, there is shown a simplified schematic diagram of the manner in which a level 102 in accordance with the present invention may be used to measure the vertical distance between the upper edge of a generally inaccessible structure such as a window frame 100 and the lower edge of a ceiling I-beam 114. As shown in the figure, window frame 100 generally includes a plurality of vertically spaced cleats 110 and is positioned upon and supported by framing 104. Dry wall sheets 106 and 108 are typically disposed on inner and outer surfaces of framing 104 and above and below the window frame 100. Level 102 includes a pair of end extensions, where a first end extension 102a is shown in contact with an upper edge 100a of the window frame 100. Using the level indicator 116, the vertical distance between an upper edge of window frame 100 and a lower edge of the ceiling I-beam 114 may be measured using a conventional tape measure 112. The end extensions on level 102 provide access to various structural members in a wide range of environments which are typically inaccessible by a conventional level.

Referring to FIG. 14, there is shown a perspective view of an extendible projection 120 for use in the level of the present invention. FIG. 15 is a partial perspective view of a level 122 incorporating extendible projection 120. Extendible projection 120 has an outwardly tapered cross section in proceeding from top to bottom and includes three spaced hemispherical recesses 120a, 120b and 120c. Recesses 120a, 120b and 120c are arranged in a linear, spaced manner along the length of the extendible projection 120 on its lower surface. As shown in FIG. 15, the extendible projection 120 is disposed in a dovetail slot 124 in a surface of the level 122 and is freely slidable along its length therein. Also disposed in level 122 is the combination of a ball insert 126 and a positioning spring 128. Positioning spring 128 may be maintained securely in position within level 122 by conventional means such as a cylindrical slot in which the spring is inserted. Disposed on one end of positioning spring 128 is the ball insert 126 which is adapted for insertion in one of the three spaced recesses 120a, 120b and 120c along the length of the extendible projection 120. As the extendible projection 120 is moved along its length within the dovetail slot 124, positioning spring 128 urges the ball insert 126 into one of the recesses 120a, 120b and 120c. The combination of the ball insert 126 and the recesses serve as a detent for maintaining the extendible projection 120 either in one of its extended positions or in its retracted position. The upward biasing of the positioning spring 128 on the ball insert 126 may be overcome by engaging an upper edge of the extendible projection 120 with one's finger or thumb and displacing it in a sliding manner within the dovetail slot 124.

Referring to FIG. 13, there is shown a perspective view partially in phantom of another embodiment of a level 122 in accordance with the present invention. As shown in FIG. 13, two upper extendible projections 138 and 140 may be displaced in either direction transverse to the longitudinal axis of the level 122 in extending or retracting the projection. First and second end extensions 130, 132 are shown in dotted-line form in opposed ends of the level 122. The second end extension 132 is shown as including three hemispherical recesses 132a, 132b and 132c disposed along its length in a spaced manner on an upper surface thereof. Disposed within the level 122 is the combination of a ball insert 134 and a positioning spring 136. As the second end extension 132 is moved along its length within a lower slot in the level 122, positioning spring 136 urges the ball insert 134 into one of the first, second or third recesses 132a, 132b and 132c. The ball insert 134 and positioning spring 136 combination thus functions as a detent for securely maintaining the second end extension 132 in either an extended or retracted position. A similar detent arrangement can be seen as provided for the first end extension 130.

There has thus been shown a hand tool for use in leveling or plumbing operations which affords access to hard to get to structures and locations. The hand tool includes level and plumb indicators disposed in a support member, or body, having first and second telescoping extension members on respective ends thereof. By inserting the distal end of one extension member in a recessed point or line on a first wall, and using the level indicator, a point or a line on another adjacent wall at the same elevation, or height, may be precisely located. The extension members may also be used to measure, in combination with a conventional tape measure, the vertical distance between two adjacent structures, one of which is accessible to and engaged by one of the extension members. Another embodiment makes use of a plurality of spaced, retractable projections along the length of the level's support member which may be extended for engaging an inner surface of a structure which is shorter than the level and thus not accessible by the level. Two or more of the projections may be extended and positioned in contact with an inner surface of the structure for leveling or plumbing the structure.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for locating a point or a line on a second wall at the same height as a recessed point or line on a first, adjacent wall, said apparatus comprising:
   an elongated body having a longitudinal axis and a flat, continuous surface;
   a level indicator disposed in said body;
   a first extendible member disposed on a first end of said body in said flat surface and moveable generally parallel to the longitudinal axis of said elongated body between an extended position, wherein said first extendible member extends beyond said first end, and a retracted position within said body, wherein said first extendible member is adapted for insertion in the recessed point or line on the first wall when in said extended position;
   a second extendible member disposed on a second, opposed end of said body in said flat surface and moveable generally parallel to the longitudinal axis of said elongated body between an extended position, wherein said second extendible member extends beyond said second, opposed end, and a retracted position within said body, wherein said second extendible member is adapted for engaging the second wall at a point at the same height as the recessed point or line on the first wall when said body is positioned in a level orientation using said level indicator;
   first and second retaining means for respectively maintaining said first and second extendible members either in said extended position or in said retracted position; and
   wherein each of said extendible members includes a plurality of spaced recesses disposed along the length thereof, and wherein each of said retaining members includes a biasing spring and insert ball combination, wherein said insert ball is urged into one of said recesses for maintaining said extendible member either in said extended position or said retracted position.

2. The apparatus of claim 1 wherein each of said first and second extendible members includes means for extending said members in a telescoping manner from a respective end of said body.

3. The apparatus of claim 2 wherein said means for extending said members in a telescoping manner includes an elongated, linear member disposed in a sliding manner in a dovetail insert attached to a respective end of said body.

4. The apparatus of claim 3 wherein each of said dovetail inserts includes a linear recess for receiving a respective elongated, linear member and first and second slots disposed in facing sides of said recess, and wherein each of said elongated, linear members includes first and second projections in facing surfaces thereof, and wherein each of said projections is inserted in a respective slot to facilitate linear sliding displacement of said elongated, linear member in the recess of its associated dovetail insert.

5. Apparatus for leveling or plumbing an inner portion of a structure, said apparatus comprising:
   an elongated, linear body having a longitudinal axis and a length greater than the inner portion of said structure thus rendering the inner portion of said structure inaccessible by said body;
   a level or plumb indicator disposed in said body;
   a plurality of extendible projections positioned on an outer portion of said body and arranged in a spaced manner along a portion of the length of said body, wherein each of said extendible projections is movable between a retracted position within said body and an extended position for engaging in an abutting manner the inner portion of said structure, wherein the length of said body over which said extendible projections extend is less than the length of the inner portion of said structure, and wherein each of said extendible projections includes a linear, elongated member disposed in a sliding manner in a respective slot in a surface of said body and aligned generally transverse to the longitudinal axis of said body;
   a plurality of retaining means disposed in said body and engaging said elongated, linear members for maintaining each of said elongated, linear members either in said extended position or in said retracted position; and
   wherein each of said elongated, linear members includes a plurality of spaced recesses along the length thereof, and wherein each of said retaining means includes a biasing spring and insert ball combination, wherein said insert ball is urged into one of said recesses for maintaining an elongated, linear member either in said extended position or in said retracted position.

6. The apparatus of claim 5 wherein each of said elongated, linear members includes opposed, beveled edges, and wherein each of said slots is dovetail-shaped for receiving a respective elongated, linear member in a tight-fitting manner.

* * * * *

UNITED STATES PATENT AND TRADEMARK OFFICE
CERTIFICATE OF CORRECTION

PATENT NO. : 5,442,864
DATED : August 22, 1995
INVENTOR(S) : Michael A. Erman

It is certified that error appears in the above-indentified patent and that said Letters Patent is hereby corrected as shown below:

In column 4, line 61, near the end of the line, delete the uppercase "S" in the word "Shown" and replace it with a lowercase "s", thereby changing the word to read -- shown --.

Signed and Sealed this

Thirty-first Day of October 1995

Attest:

BRUCE LEHMAN

*Attesting Officer*  *Commissioner of Patents and Trademarks*